United States Patent [19]
Bishop

[11] 3,756,287
[45] Sept. 4, 1973

[54] PIPE FITTING ACCESS
[76] Inventor: Robert L. Bishop, Rt. No. 2, Box 130, Ballwin, Mo. 63011
[22] Filed: Mar. 16, 1972
[21] Appl. No.: 235,214

[52] U.S. Cl. ............................................. 138/92
[51] Int. Cl. ........................................... F16l 55/10
[58] Field of Search ..................... 138/92, 99, 104; 220/3.8, 42 B, 47

[56] References Cited
UNITED STATES PATENTS

| 1,237,408 | 8/1917 | Strong | 138/92 |
| 492,191 | 2/1893 | Cram | 138/92 X |
| 1,348,937 | 8/1920 | Girtanner | 138/92 |
| 3,166,631 | 1/1965 | Reiland | 138/92 X |

Primary Examiner—George E. Lowrance
Assistant Examiner—Steven M. Pollard
Attorney—Glenn K. Robbins

[57] ABSTRACT

A pipe fitting access for pipelines to insert clean-out and repair tools and the like. The access is in the form of a pipe section formed as part of the existing pipe or insertable in the pipe. The access has an integral housing receiving a removable slightly wedge-shaped insert. The insert has a semicylindrical bottom surface merging with the interior of the pipe and providing for a full diameter opening for the insertion of tools. The housing has a flanged rim receiving a mating flange rim of the access with connecting means on the rim. Jack screws are provided to free the insert. The pipe fitting is further provided with a valve sampling tube communicating with the interior of the pipeline for fluid sampling.

4 Claims, 10 Drawing Figures

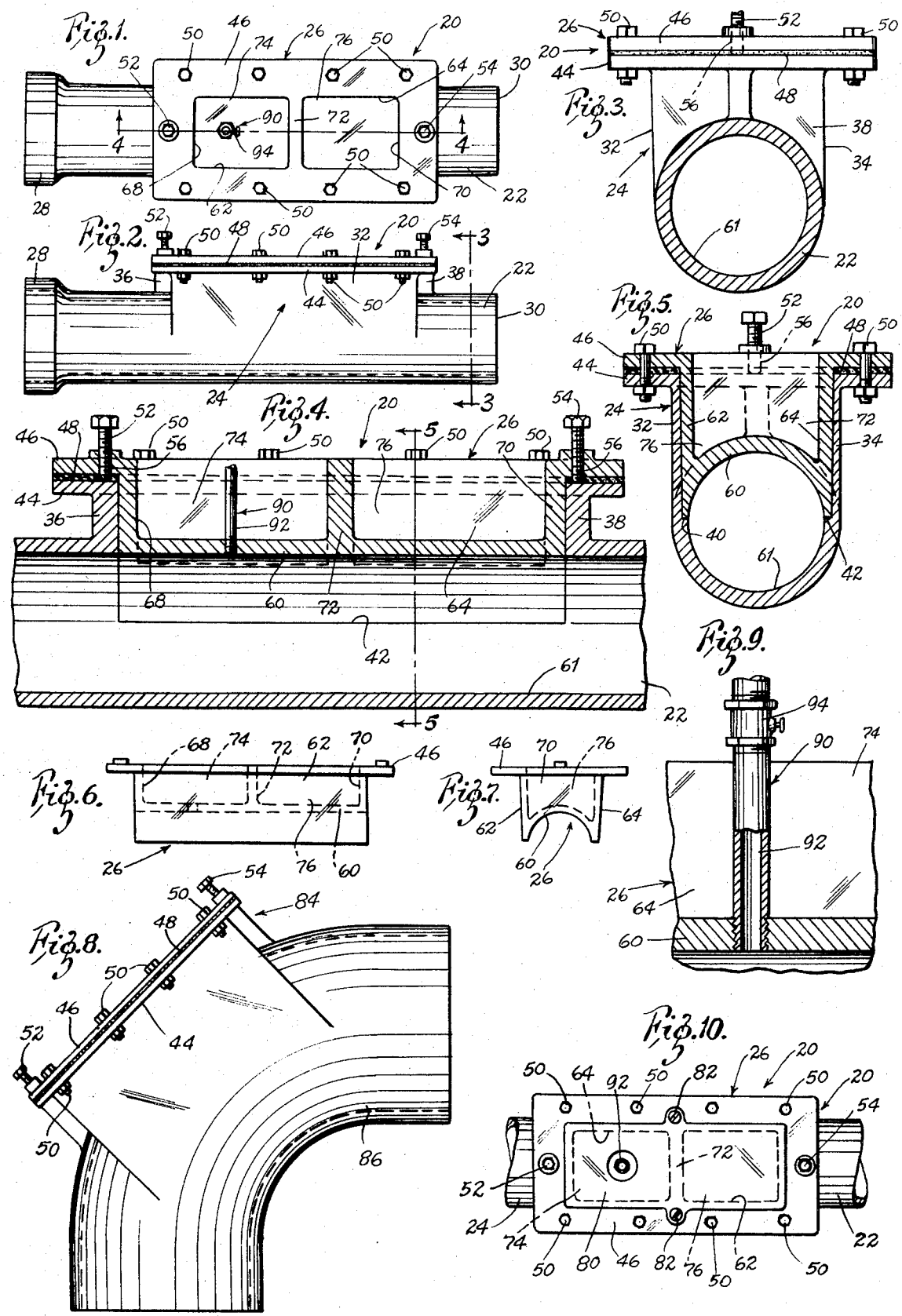

PIPE FITTING ACCESS

SUMMARY OF THE INVENTION

By means of this invention, there has been provided a pipe fitting access for insertion of various types of tools into a pipeline. The pipe fitting access provided by this invention is in the form of an elongated opeing formed in a housing of a special pipe fitting which is insertable in a pipeline. The housing receives a removable insert closing the opening in the housing and having a semicylindrical bottom surface which provides a flush relationship with the remainder of the interior of the pipeline and a continuous and uninterrupted flow of fluids within the pipeline and pipe fitting access.

The insert for the pipe fitting access is of a specially constructed design providing for nesting within the housing of the pipe fitting section through tapering side walls which abut against a shoulder formed at the bottom of the housing. A firm and sealed realtionship is provided by a flanged rim of the housing which receives a mating flange rim of the insert with connection being effected by means of connecting bolts. In order to free the insert, jack screws are provided through threaded openings in the flange of the insert which bear against the flange of the housing to jack the insert away from the housing for easy removal. The insert is of an open construction for ready reception of spare nuts and bolts and the like and a cover is adapted for use to maintain these in place when the pipe fitting access is positioned on the bottom or the side of a pipe.

The pipe fitting access of this invention is further provided with a valve fluid sampling tube which opens into the interior of the pipe section. The sampling tube extends through the insert and by valve means can be opened and closed to draw off waste fluid or other types of fluid samples through a hose connection to the end of the sampling tube. This fitting particularly lends itself to waste fluid sampling of toxicity pollutants, and the like and can be used for any type of fluid sampling.

The pipe fitting access is designed for use in any type of pipeline and can be connected by any type of jointing desired such as bell joint or flange connnection as will be obvious to those skilled in the art. Through the elongated opening provided in the pipe fitting access and the width of the access opening, which is a full diametrical width, a wide variety of tools can be received within the pipeline and can be readily inserted. The pipe fitting access can be installed and used by unskilled workmen without any special tools or difficult installation required.

The above features are objects of this invention and further objects will appear in the detailed description which follows and will otherwise be apparent to those skilled in the art.

For the purpose of illustration of this invention, there is shown in accompanying drawings a preferred embodiment thereof. It is to be understood that these drawings are for the purpose of example only and that the invention is not limited thereto.

In the Drawings:

FIG. 1 is a top plan view of the pipe fitting access of this invention.

FIG. 2 is a view in side elevation of the pipe fitting access.

FIG. 3 is an enlarged view in section taken on the line 3—3 of FIG. 2.

FIG. 4 is an enlarged view in section taken on the line 4—4 of FIG. 1.

FIG. 5 is a view in section taken on the line 5—5 of FIG. 4.

FIG. 6 is a view in side elevation of the pipe fitting access insert.

FIG. 7 is an end view of the pipe fitting access taken from the right side of FIG. 6.

FIG. 8 is a view in side elevation of a pipe elbow provided with the pipe fitting access of this invention.

FIG. 9 is an enlarged view in vertical section of the water sampling tube.

FIG. 10 is a top plan view of the access provided with an access cover.

DESCRIPTION OF THE INVENTION

The pipe fitting access of this invention is generally indicated in the drawings by the reference numeral 20. It is comprised of a pipe section 22, flange fitting access housing portion 24 and an access insert 26.

The pipe portion 22 is of generally standard construction adapted to fit into a pipe line such as a sewer or drain pipe or the like, and is provided with a conventional bell or flange 28 at one end and a standard end 30 at the opposite end.

The housing 24 is best shown in FIGS. 2 through 5. It is formed on the middle portion of the pipe section 22 and has parallel side walls 32 and 34 bounded by end walls 36 and 38. The inner surfaces of the side walls taper downwardly as best shown in FIG. 5 and terminate at shoulder portions 40 and 42 to receive in butting relation the insert. The top walls of the housing have a flange portion 44 which receives a mating flange portion 46 around the boundary of the insert. A gasket 48 is adapted to be placed between the housing and insert flanges for sealing. Connecting bolts 50 are provided at the opposite sides of the insert flange and are adapted to draw the flanges tight in the relationship shown in FIG. 5.

A jack bolt means is provided for breaking the seal between the flanges of the insert and the housing through the provision of jack bolts 52 and 54 at the opposite ends of the housing. This is best shown in FIGS. 1 and 4. The bolts fit through threaded openings 56 in the flange of the insert and bear against the flange of the housing. When the bolts are turned clockwise by a wrench, the threads on the threaded openings 56 in the insert flanges cause the bolts to bear against the housing with the consequent breaking apart of the flanges when the insert is desired to be removed for access to the interior of the pipe.

The interior construction of the insert 26 is best shown in FIGS. 4 and 5. As there shown, the insert has a semi-cylindrical bottom surface 60 which forms a smooth circumferential uninterrupted continuance of the interior surface 61 of the pipe section. The outside side walls 62 and 64 of the insert taper downwardly and nest closely in wedging relationship with the tapering side walls of the housing in the relationship shown in FIG. 5. The bottom ends of the side walls and the semicylindrical surface 60 butt against the shoulders 40 and 42 to provide a secure closure.

The insert has a hollow opening defined by end walls 68 and 70 and the side walls 62 and 64. A medial cross rib 72 connects the side walls and provides for rigidity. Through the structure of the end and side walls, two open compartments 74 and 76 are provided which may receive spare nuts and bolts and the like.

A sampling device for use with the pipe fitting access is shown in FIG. 9 generally identified by the reference numeral 90. It is formed as an example by a threaded tube 92 fitted through an opening in the semi-cylindrical wall 60. A valve 94 is provided at the top of the tube to open and close flow through the withdrawal tubes. It will be understood that a flexible hose or the like may be connected to the top of the tube 92 to drain fluid passing through the pipe fitting access to a convenient receptical for analysis of the sample as desired.

In FIG. 10, a cover 80 is provided on the top of the insert. This cover is connected to the flange 44 of the insert by connecting screws 82. A cover 80 can be employed when the insert of the pipe fitting access is located at the side or bottom of the pipe to keep spare parts from falling out.

A modified pipe fitting access is designated by the reference numeral 84 in FIG. 8. This pipe fitting access is shown on an elbow 86 and is similar in construction to the pipe fitting access 20 described in FIGS. 1 through 7. However, the interior arcuate surface 60 of the insert in the housing is formed in the nature of an elbow to provide full congruity with the elbow 86 as will be well understood by those skilled in the art.

Use

The pipe fitting access of this invention is adapted for very simple use in an existing pipeline. In such use the entire pipe fitting access designated by the reference numeral 20 is used to replace an existing section of pipe. The bell flange 28 and the reduced end 22 of the access can easily be fitted within the pipe section which is cut into. It will be understood that other types of pipe fitting connections can be employed as is apparent to those skilled in the art.

Once the pipe fitting access has been installed in the pipeline, it establishes a continuation of the smooth interior surface of the existing pipe line without any interruptions or obstructions. When the pipeline is desired to be opened for access to the interior for insertion of various types of cleaning and repair tools or the like, the insert 26 is removed. This is accomplished by simply loosening the connecting bolts 50. Once this has been effected, the jack bolts 52 are operated with a wrench in a clockwise direction to thread the bolts through the threaded opening in the flange 46 of the insert. This causes the bottom of the jack screw to bear against the top of the flange 44 of the housing and force the insert away. This forcing and breaking away overcomes any force of adhesion and also overcomes the wedging relationship and frictional resistance encountered in the insertion of the insert with the tapering walls inside the housing.

With the insert removed, a pipe fitting cleaning tool can be inserted with the full diameter of the pipe section being made available. Once the cleaning operation has been effected, the insert is reinserted with the tapering side walls of the insert nesting within the side walls 32 of the housing. The bottom edge of the insert butts against the shoulder 40 of the pipe section and the connecting bolts are again fastened with the gasket 48 placed between the flanges of the insert of the housing to provide for sealing.

When sampling operations are desired to be effected, the sampling tube is connected to a flexible hose or the like. The valve 94 is then opened and a sample withdrawn for any type of analysis desired. Thus, the pipe fitting access provides not only for insertion of tools when the insert is removed but also for sampling of the fluid contents of the pipeline at all times.

The modification of FIG. 8 is used in the same fashion as that described for the straight pipe section 20 of FIG. 1. In the elbow modification of FIG. 8 a tool can be inserted substantially in line with either of the right angle sections of the pipe and it will be understood that the insert is made to be flush with the interior of the pipeline in the same general fashion as that described above.

Various changes and modifications may be made within this invention as will be readily apparent to those skilled in the art. Such changes and modifications are within the scope and teaching of this invention as defined by the claims appended hereto.

What is claimed is:

1. A pipe fitting access comprising a pipe section fitting receivable in a pipe line to provide uninterrupted flow through the interior walls which are aligned with and present a continuous smooth wall surface with the interior walls of the pipeline, said pipe section having an access housing opening into the interior of the pipe to provide an elongated opening having a width substantially equal to the inside diameter of the pipeline, said housing receiving in nested relation a removable insert, said insert having a semicylindrical concave surface fitting flush with the interior surface of the pipe fitting and a sampling conduit opening into said concave surface and means for opening and closing said conduit.

2. The pipe fitting access of claim 1 in which the sampling conduit is provided with valve means.

3. A pipe fitting access comprising a pipe section fitting receivable in a pipe line to provide uninterrupted flow through the interior walls which are aligned with and present a continuous smooth wall surface with the interior walls of the pipeline, said pipe section having an access housing opening into the interior of the pipe to provide an elongated opening having a width substantially equal to the inside diameter of the pipeline, said housing receiving in nested relation a removable insert, said insert having a semicylindrical concave surface fitting flush with the interior surface of the pipe fitting and said housing having outwardly tapering opposite walls extending tangentially from a shoulder provided on the semicircular interior side wall of the access and said insert having congruent outwardly tapering side walls extending from the semicylindrical concave surface and said insert being receivable in closely nested relation within the housing side walls upon said shoulder.

4. The pipe fitting access of claim 3 in which the housing has an exterior opening provided with a peripheral flange, said insert being provided with a peripheral flange engageable upon the housing flange when the inserted is fitted in the access, means connecting said flanges and jack means for breaking the insert flange away from the housing flange when the insert is desired to be removed and in which said jack means comprises a bolt means threadedly received in an opening in the insert flange and bearable against the housing flange when the bolt means is screwed through the insert flange.

* * * * *